(12) United States Patent　　(10) Patent No.:　US 12,621,686 B2

Mishra　　(45) Date of Patent:　**\*May 5, 2026**

(54) DEMAND-BASED DYNAMIC CARRIER SCALING

(71) Applicant: Parallel Wireless, Inc., Nashua, NH (US)

(72) Inventor: Rajesh Kumar Mishra, Westford, MA (US)

(73) Assignee: Parallel Wireless, Inc., Nashua, NH (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/657,560

(22) Filed: May 7, 2024

(65) Prior Publication Data

US 2025/0008353 A1　　Jan. 2, 2025

Related U.S. Application Data

(63) Continuation of application No. 17/721,720, filed on Apr. 15, 2022, now Pat. No. 11,979,757, which is a continuation of application No. 16/860,051, filed on Apr. 27, 2020, now Pat. No. 11,310,682.

(60) Provisional application No. 62/839,083, filed on Apr. 26, 2019.

(51) Int. Cl.
| | |
|---|---|
| *H04W 24/04* | (2009.01) |
| *H04B 7/0413* | (2017.01) |
| *H04B 7/06* | (2006.01) |
| *H04L 5/00* | (2006.01) |

(Continued)

(52) U.S. Cl.
CPC .......... *H04W 24/04* (2013.01); *H04B 7/0413* (2013.01); *H04B 7/0617* (2013.01); *H04L 5/0064* (2013.01); *H04W 72/0453* (2013.01); *H04W 88/16* (2013.01)

(58) Field of Classification Search
CPC . H04W 24/04; H04W 72/0453; H04W 88/16; H04B 7/0413; H04B 7/0617; H04L 5/0064
See application file for complete search history.

(56) References Cited

U.S. PATENT DOCUMENTS

| | | | |
|---|---|---|---|
| 10,264,621 B2 * | 4/2019 | Cao ....................... | H04W 76/27 |
| 2015/0094055 A1 * | 4/2015 | Mallikarjunan ...... | H04W 76/34 |
| | | | 455/552.1 |
| 2015/0223135 A1 * | 8/2015 | Ratasuk ................ | H04W 36/20 |
| | | | 455/436 |

OTHER PUBLICATIONS

"5G; Management and orchestration; Self-Organizing Networks (SON) for 5G networks", (3GPP TS 28.313 version 16.2.0 Release 16), Jan. 2022.

\* cited by examiner

*Primary Examiner* — Vineeta S Panwalkar

(74) *Attorney, Agent, or Firm* — Michael Y. Saji; Ashish Patel

(57)　　ABSTRACT

Systems, methods and computer software are disclosed for demand-based dynamic carrier scaling. In one embodiment a method is disclosed, comprising: determining, at a gateway supporting dynamically created cells in a wireless network, whether there is a requirement for additional capacity; when there is a requirement for additional capacity, then providing, by the gateway, dynamically created cells as needed to handle the requirement for additional capacity; determining, at the gateway, whether there is a requirement for less capacity; and when there is a requirement for less (Continued)

capacity, then turning off, by the gateway, dynamically created cells as needed to handle the requirement for less capacity.

18 Claims, 5 Drawing Sheets

(51) Int. Cl.
*H04W 72/0453* (2023.01)
*H04W 88/16* (2009.01)

DEMAND-BASED DYNAMIC CARRIER SCALING

CROSS-REFERENCE TO RELATED APPLICATIONS

This application is a continuation of U.S. application Ser. No. 17/721,720, filed Apr. 15, 2022, which is a continuation of U.S. application Ser. No. 16/860,051, filed Apr. 27, 2020, which claims priority under 35 U.S.C. § 119 (c) to U.S. Provisional Pat. App. No. 62/839,083, filed Mar. 26, 2019, titled "Demand-Based Dynamic Carrier Scaling", each of which is hereby incorporated by reference in its entirety for all purposes. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1.

This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289, 821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety. This document also hereby incorporates by reference U.S. Pat. Nos. US9491801; US9479934; US10123232; US10237914; US10264621; US10595242, in their entirety.

BACKGROUND

Cellular base stations are equipped with transceivers that enable user devices, called user equipments (UEs), to connect to them to provide service. The data rate provided is related to the specific amount of bandwidth that is made available for the UE by the base station, as well as by the constraints of the specific radio access technology (RAT) standard (e.g., 2G, 3G, 4G, 5G, Wi-Fi, or other RATs as appropriate). For convenience, throughout this disclosure, bandwidth that is made available for UEs, having a UE-detectable signal and enabled to carry data, is called a carrier, and the details are dependent on the specific RAT.

SUMMARY

Methods, computer readable medium and systems for demand-based dynamic carrier scaling are described. In one embodiment a method is disclosed, comprising: determining, at a gateway supporting dynamically created cells in a wireless network, whether there is a requirement for additional capacity; when there is a requirement for additional capacity, then providing, by the gateway, dynamically created cells as needed to handle the requirement for additional capacity; determining, at the gateway, whether there is a requirement for less capacity; and when there is a requirement for less capacity, then turning off, by the gateway, dynamically created cells as needed to handle the requirement for less capacity.

In another embodiment, a non-transitory computer-readable medium containing instructions for providing demand-based dynamic carrier scaling is disclosed. The instructions, when executed, cause a system to perform steps including determining, at a gateway supporting dynamically created cells in a wireless network, whether there is a requirement for additional capacity; when there is a requirement for additional capacity, then providing, by the gateway, dynamically created cells as needed to handle the requirement for additional capacity; determining, at the gateway, whether there is a requirement for less capacity; and when there is a requirement for less capacity, then turning off, by the gateway, dynamically created cells as needed to handle the requirement for less capacity.

In another embodiment, a system may be disclosed for providing demand-based dynamic carrier scaling. The system may include a gateway; at least one cell in communication with the gateway; wherein the gateway supports dynamically created cells in a wireless network, and wherein the gateway determines whether there is a requirement for additional capacity; when there is a requirement for additional capacity, then providing, by the gateway, dynamically created cells as needed to handle the requirement for additional capacity; wherein the gateway determines whether there is a requirement for less capacity; and when there is a requirement for less capacity, then turning off, by the gateway, dynamically created cells as needed to handle the requirement for less capacity.

DETAILED DESCRIPTION

Figure 1A:
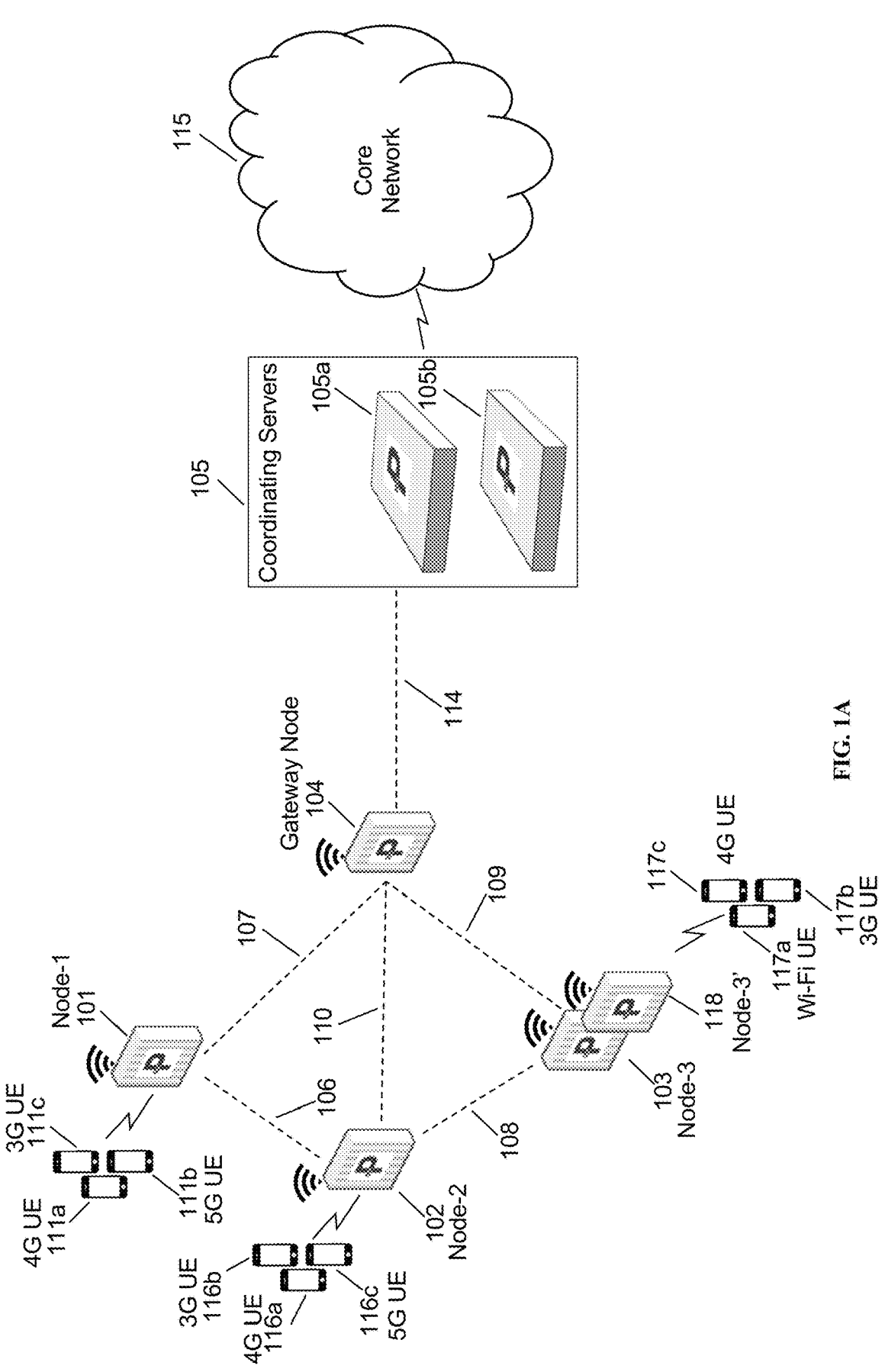
FIG. 1A is a network diagram in accordance with some embodiments.

In 4G (LTE), certain specific bandwidths are used, e.g., 1.4 MHz, 3 MHz, 5 MHZ, 10 MHz, 15 MHz, and 20 MHz are specified as options for an amount of bandwidth to be used for one carrier. As 20 Mhz is a common bandwidth in LTE, commonly-available radio equipment is designed to be efficient for enabling a 20 MHz bandwidth carrier. As well, different radio frequency bands have different physical characteristics. These bands are specific radio frequencies that are identified by governments and international organizations as being licensed for cellular use. Since the bands are well-known, commonly-available radio equipment is also configured to be most efficient when used for enabling carriers that fall into these bands. For LTE, more information is found at 3GPP TS 36.101 E-UTRA Operating Bands, E-UTRA Channel Bandwidth, which latest standards known as of the priority date are hereby incorporated by reference. As well, it is common for radio equipment such as filters, transmitters, etc. to be efficient when a certain minimum power level is used to power the equipment.

It is an objective of network operators to minimize power usage and to operate power-efficiently, as the cost of electrical power for radio transmission equipment is often a significant driver of cost. However, since it is difficult to turn off radio equipment even when only a small amount of data is required to be transmitted, as the certain minimum power level is required to support keeping a 20 MHz band active, it is common for base station equipment to use only a limited subset of radio frequency bands, and to continue to keep them powered on even when only a small number of users is connected. Power is also consumed by the radiating element, i.e., the radio, and also by the processing power required for the baseband, and also for cooling and HVAC. All of these power factors depend at least in part on the amount of bandwidth being provided at the base station. This leads to a certain level of wasted power and expense. It is a known problem, therefore, to increase power efficiency and reduce total power draw.

Dynamically lighting up carriers, channels, and/or bands is a potential way to reduce power consumption. For example, if a carrier is not being used by any UEs in an active state, very little data need be transmitted, so very little bandwidth is theoretically needed, and power usage can be reduced, including HVAC, baseband processing, backhaul bandwidth, etc. LTE contemplates various different channel bandwidths, and less than 20 MHz would seem to be needed in this use case. However, it is difficult to dynamically turn on and off carriers using present-day technology. In 3G and 4G, the control channel for the channel is spread throughout the entirety of the carrier band. This makes it difficult to increase or decrease the bandwidth of a channel without completely turning the channel off and turning on a new channel. Turning a channel off further entails kicking each attached UE off, which entails control signaling from the UE to the core network, causing a potential signaling storm; waking up the UE via paging if necessary, reducing battery life; and temporarily causing the UEs to be handed over to another base station, which may require additional UE power, etc. Given these constraints, it is very difficult to provide truly dynamic adjustments to the power envelope.

A key insight of the present application is that an individual cell can serve as the unit of capacity increase or decrease, in some embodiments. This approach is not common to network operator planning or radio network planning. Typically, cells are statically planned, and are designed to be maintained with their power turned on. Cells are planned to accommodate both the best and worst case scenarios, and therefore have difficulty coping both with overutilization (overcapacity) and underutilization (undercapacity, such as at night). Turning cells dynamically on and off to increase or decrease capacity is thus not typically contemplated by the prior art. However, a virtualization gateway located between the RAN and the core network can facilitate this capability. The virtualization gateway described in the following documents is capable of facilitating dynamic cells: U.S. Pat Nos. US9491801; US9479934; US10123232; US10237914; US10264621; US10595242, each of which is also hereby incorporated by reference in its entirety for all purposes. The virtualization server is also referred to throughout this disclosure as a Heterogeneous Network Gateway or HNG.

In some embodiments, the virtualization gateway may virtualize the radio access network toward the core, such that the core network becomes agnostic to the specific number and configuration of radio access network (RAN) nodes that are currently in the network. The virtualization gateway may also virtualize the core network toward the RAN, such that each RAN node communicates handovers and inter-cell communication with the virtualization server instead of toward the core network. This enables the RAN nodes to be freed from the requirements and limitations of coordination with the core network. For example, requiring a handover that would potentially result in a signaling storm becomes possible. Instead of a signaling storm toward the core, the virtualization server transparently proxies all communications towards the RAN, and silences unnecessary communications towards the core network. When put into the context of the present disclosure, this enables cells to be turned on and off, and cells to be created and destroyed, without any communication toward the core network.

In some embodiments, the virtualization gateway is also able to be RAT-agnostic, such that any RAN node can be treated as a RAN of any particular RAT. The RAT can be selected based on the capability of the underlying core network. For example, 2G and 3G RAN nodes can be used with a 4G core, or a 5G NSA core, or multiple cores, by presenting them towards the core as virtual 4G RAN nodes. Any combination of RATs is contemplated. When put into the context of the present disclosure, this enables the network operator to have the option to substitute, dynamically, a carrier using one RAT with a carrier using any other RAT. For example, this enables a 20 MHz 4G carrier to be substituted at a time of low usage for a 2G carrier, saving a tremendous amount of electrical power and processing power. Or as another example, this enables a 3G carrier to be dynamically powered down, and instead a 4G carrier and a 5G carrier to be brought up at that time to handle increased bandwidth demands.

Turning to the dynamic creation and destruction of cells and carriers, in some embodiments, this is enabled by: creating a new cell at the RAN node, as a dynamically created cell or carrier, in conjunction with the HNG; performing signaling between the current serving cell (the old cell or old carrier) and the new cell as target cell to handover all UEs to the new cell; powering off the old cell; and, in some embodiments, performing management of the old carrier in conjunction with the HNG, including one or more of: allocating new carriers as a subset of the old carrier; allocating a carrier of a different RAT; allocating a carrier with different configuration than the old carrier; inactivating the old carrier. Configuration of the new carrier may be obtained from the HNG. Virtualization at the HNG may be used to suppress signaling from the RAN node to one or more cores.

The present disclosure also contemplates, in some embodiments: handing over one or more UEs to a new dynamically-allocated carrier at the same RAN node; suppressing signaling from the one or more UEs to one or more cores to facilitate dynamically allocating a carrier; determining desired characteristics of a carrier to be dynamically allocated at the RAN node to serve UEs, at a present time or at a future time; reducing power usage at a RAN node by using a new carrier allocated as a dynamically-allocated carrier at a same RAN node as an existing carrier; determining, at a gateway, whether there is a need for more or less capacity at a RAN node; determining, at a RAN node, whether there is a need for more or less capacity at the RAN node; sending information and/or signaling from a RAN node to a gateway to facilitate a determination of whether there is a need for more or less capacity at a RAN node; using a determination of whether there is a need for more or less capacity at a RAN node to activate or inactivate a cell or carrier.

FIG. 1A is a network diagram in accordance with some embodiments. In some embodiments, as shown in FIG. 1A, a mesh node 1 101, a mesh node 2 102, and a mesh node 3 103 are any-G RAN nodes. Base stations 101, 102, and 103 form a mesh network establishing mesh network links 106, 107, 108, 109, and 110 with a base station 104. The mesh network aspect of FIG. 1A is optional and does not need to be present in all embodiments of the present disclosure. The mesh network links are wireless backhaul links that can be used by the mesh nodes to route traffic around congestion within the mesh network as needed. The base station 104 acts as gateway node or mesh gateway node, and provides backhaul connectivity to a core network to the base stations 101, 102, and 103 over backhaul link 114 (which may be wired or wireless) to a coordinating server(s) 105 and towards core network 115. The Base stations 101, 102, 103, 104 may also provide eNodeB, NodeB, Wi-Fi Access Point, Femto Base Station etc. functionality, and may support radio access technologies such as 2G, 3G, 4G, 5G, Wi-Fi etc. The base stations 101, 102, 103 may also be known as mesh network nodes 101, 102, 103.

Coordinating server 105 includes failover servers 105a and 105b. Coordinating server 105 is the virtualization gateway described in the present disclosure, and is present between the RAN and the core network. Core network 115 may be one or more core networks; may be of any RAT, including 2G/3G/4G/5G NSA/5G SA.

Also shown are is a new dynamically created cell 118, labeled Node-3'. Dynamically created cells are described in detail throughout the present disclosure. In operation, if UEs 117a, 117b, 117c are all attached to base station 103, and if additional resources are needed, cell 103 can coordinate with coordinating servers 105 to dynamically create another cell 118 or node-3'. In some embodiments, two cells are created and all UEs are handed over from node-3 to node-3' and node-3" (not shown). The dynamically created cells can be of any RAT, based on the needs and requirements of the UEs that are attached. In some embodiments, a dynamically created cell may be created to enable power reduction, i.e., when fewer resources are required for use. While one dynamically created cell is shown, it should be appreciated that any number of dynamically created cells may be used. The number of dynamically created cells may be increased or decreased as demand requires. In the present disclosure, any method may be used to determine or calculate demand, including: counting UEs; bandwidth required by UEs; peak bandwidth or average bandwidth; latency requirements; minimum RAT requirements; voice or data; etc.

The coordinating servers 105 are shown as two coordinating servers 105a and 105b. The coordinating servers 105a and 105b may be in load-sharing mode or may be in active-standby mode for high availability. The coordinating servers 105 may be located between a radio access network (RAN) and the core network and may appear as core network to the base stations in a radio access network (RAN) and a single eNodeB to the core network, i.e., may provide virtualization of the base stations towards the core network. As shown in FIG. 1A, various user equipments 111a, 111b, 111c are connected to the base station 101. The base station 101 provides backhaul connectivity to the user equipments 111a, 111b, and 111c connected to it over mesh network links 106, 107, 108, 109, 110 and 114. The user equipments may be mobile devices, mobile phones, personal digital assistant (PDA), tablet, laptop etc. The base station 102 provides backhaul connection to user equipments 112a, 112b, 112c and the base station 103 provides backhaul connection to user equipments 113a, 113b, and 113c. The user equipments 111a, 111b, 111c, 112a, 112b, 112c, 113a, 113b, 113c may support any radio access technology such as 2G, 3G, 4G, 5G, Wi-Fi, WiMAX, LTE, LTE-Advanced etc. supported by the mesh network base stations, and may interwork these technologies to IP.

HNG to Support Dynamic Cells

One key insight of the present disclosure is that an individual cell can serve as the unit of capacity increase/decrease. We can turn on cells as needed to provide additional capacity. We can turn off cells as needed as well. This is all managed by the HNG, which provides this capacity. Virtualizes small cells toward the core—the core does not know or care that these cells are coming online. RAT agnostic—any RAT cell can be brought online without requiring RAT-specific core, without requiring each core to be informed. HNG also provides capability to hand users over from one cell to another as it terminates the user connections.

Figure 1B:
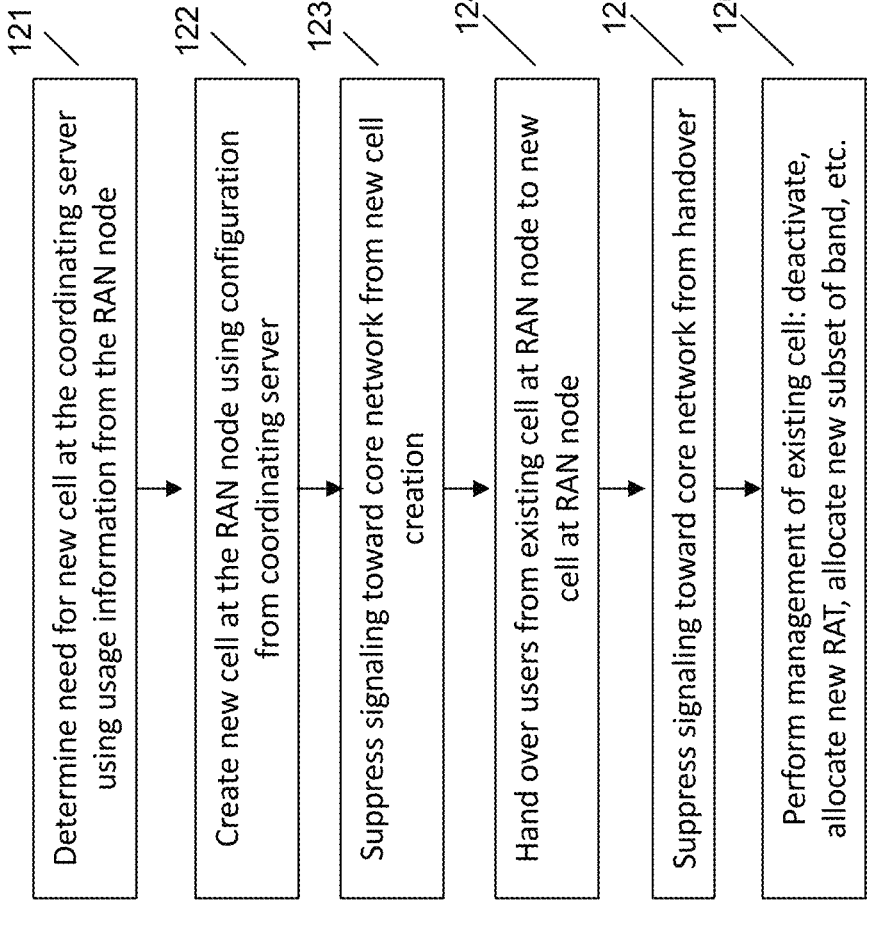
FIG. 1B is a flowchart, in accordance with some embodiments.

FIG. 1B shows a flowchart for a method of operation, in accordance with some embodiments. At 121, determine need for new cell at the coordinating server using usage information from the RAN node; at 122, create new cell at the RAN node using configuration from coordinating server; at 123, suppress signaling toward core network from new cell creation; at 124, hand over users from existing cell at RAN node to new cell at RAN node; at 125, suppress signaling toward core network from handover; at 126, perform management of existing cell: deactivate, allocate new RAT, allocate new subset of band, etc.

In operation, in some embodiments, one RAT functions as the anchor cell-start with one RAT as the baseline for providing a control channel. This control channel can be 2G or 4G (with 2G having the advantages at least that it is the least computationally expensive and also has wide compatibility; 4G is desirable in some cases as it is flexible for providing a high level of functionality for a large number of users, and can be virtualized readily by the coordinating server, and can broadcast extended capabilities or expanded capabilities to UEs that may seek to connect). The existing cell can be the anchor cell, in some embodiments. Then additional dynamically generated cells can be created in conjunction, either with the same or different RATs. Certain appropriate examples are provided below.

When more users appear, more throughput is required, more channels, more voice channels, etc.—start up a new dynamically created cell. The dynamically created cell exists at the same CWS (base station with virtualization capability), managed by HNG (coordinating node). This avoids the control channel issues. New cell gets allocation of PCI, other control parameters, etc. from HNG, which manages this without consulting core network (i.e., virtualizing the cell from the core network perspective). HNG migrates existing users to the new cell as needed.

It is appreciated by the inventors that different permutations (different carriers, multiple carriers, different bandwidths) provide only a small difference in power consumption for commercially-available RF filters, power amplifiers, and other equipment. Therefore, in some embodiments, the coordinating server may prioritize usage of all 20 MHz of the commonly available 20 MHz carrier, although it may use different combinations of RATs, carriers, configurations, etc. to do so. In some embodiments, the use of advanced power amplifiers that consume less power when they use less of an available frequency band is contemplated, and reduction of bandwidth used can be used to reduce power usage. In some embodiments, reduction of electrical power usage can be a metric used to determine the need for more or fewer dynamically allocated carriers.

Use Case—LTE

Start with 1 LTE cell, 3.5 MHz. Don't need 20 MHz yet. Results in better power efficiency during idle. HNG monitors usage. When usage exceeds a threshold, CWS activates a new LTE cell, also 3.5 MHz, in an adjacent band supported by the same RF chain at the CWS; new cell can be deallocated when needed. HNG handles migration of users, setup/teardown of new cell. Result: 7.0 MHz of spectrum used, optimal power efficiency.

Use Case: Demand Analytics

We can see which UEs appear on the network and determine their RAT capability based on their SIM or IMSI, etc. for example, if all UEs are able to support 4G, light up additional 4G carriers. If the bulk of the UEs can support high-speed 5G or Wi-Fi transfer, light up 5G or Wi-Fi RATs and offload the high throughput users to those cells. Time of day, other usage analytics etc. taken into account so we can programmatically turn on or off capacity Alternatives

2G

Start with 1 transceiver (TRX) for control channel, and dynamically light up 2nd TRX, more TRXes based on need. 2G is useful for providing voice. Dynamically light up 2G carriers to provide voice fallback for LTE or for another RAT. Start with 2G carrier, light up 4G to provide data as needed. 2G is useful for providing/optimizing for voice.

3G

Same as 2G—can use 3G as voice fallback and can light up 3G carriers for voice fallback; can steer to 4G for more throughput.

5G

5G Standalone core mode only when needed data throughput reaches a certain threshold; otherwise stick with non-standalone and use the LTE control channel. Start with LTE, light up 5G where needed to provide additional throughput.

Wi-Fi

MIMO. Light up more TRXes. Increase or decrease MIMO targeting. Increase or decrease Wi-Fi data rate.

Inter-RAT

Move people from 3G, 4G, 5G to 2G if they want to use voice; dynamically light up a 2G carrier. Move people from 5G to 4G if data needs are moderate. Inter-RAT steering based on UE capability. For example, if several UEs want to connect to the base station and the base station determines they are all capable of 4G, shut down other RATs and/or move the UEs all to 4G (or any other G).

M-MIMO—Activate More Antenna Modules Dynamically.

Satellite—Beamspotting, from the sky, for example, a 50 km/\2 area in a village. Light up a small area or a big area based on demand.

Additional Alternatives

Any resources could be dynamically added or turned off using the presently disclosed idea, e.g., other bands, other resources, TRXes, resource blocks, RATs, frequencies, channels, higher power, lower power, coverage, cell edge augmentation, M-MIMO, beamforming, 3GPP version compatibility with a higher Rel. no. (e.g., detect when all UEs are capable of Rel. 15, light up a Rel. 15 cell, steer all users to the new cell)

Take into account power efficiency of various factors when powering things on or off e.g., Baseband, power amplifier/RF chain, edge coverage, HVAC, RF emissions.

Figure 2:
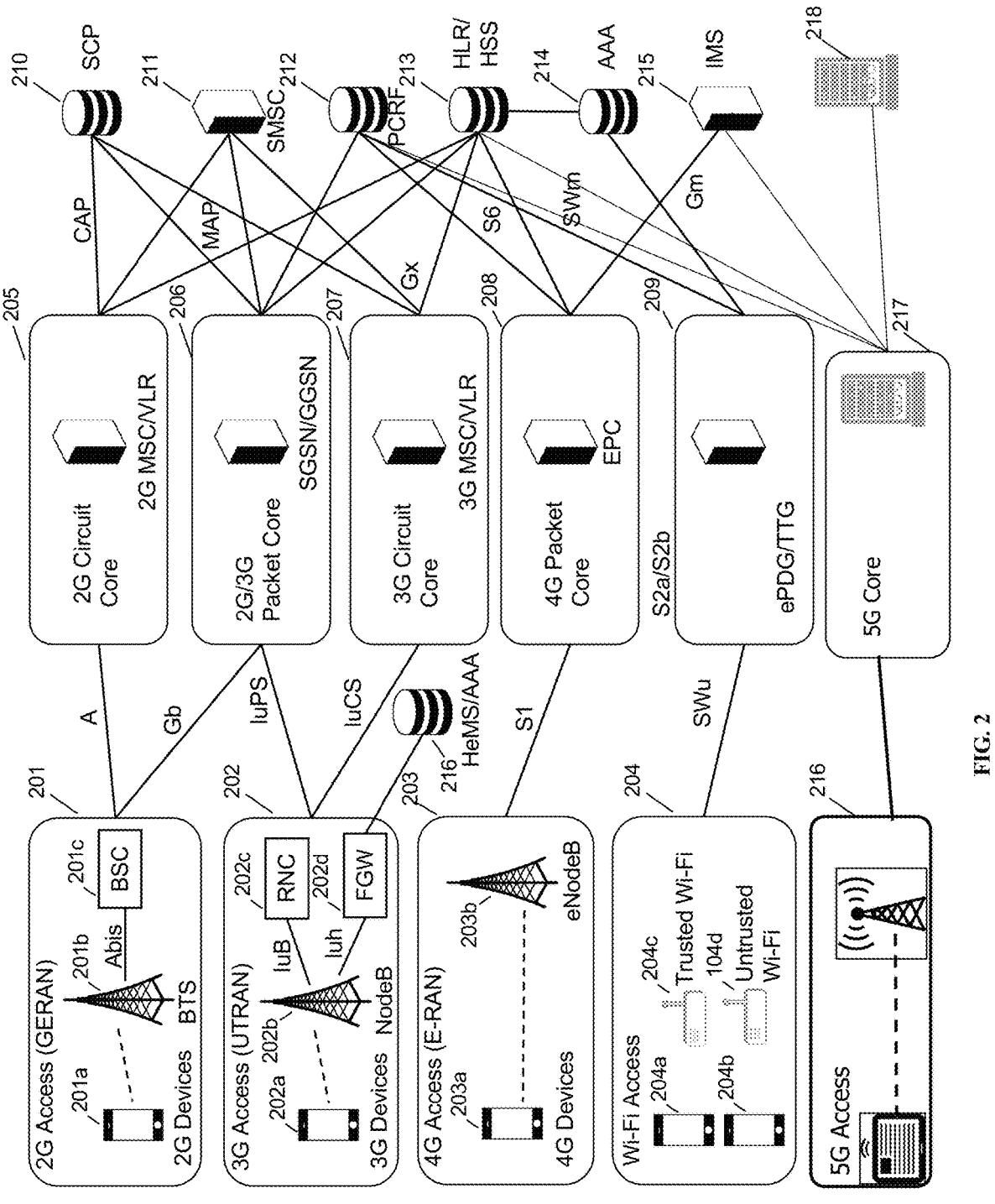
FIG. 2 is a schematic network architecture diagram for 3G and other-G networks, in accordance with some embodiments.

FIG. 2 is a schematic network architecture diagram for 3G and other-G networks. The diagram shows a plurality of "Gs," including 2G, 3G, 4G, 5G and Wi-Fi. 2G is represented by GERAN 101, which includes a 2G device 201a, BTS 201b, and BSC 201c. 3G is represented by UTRAN 202, which includes a 3G UE 202a, nodeB 202b, RNC 202c, and femto gateway (FGW, which in 3GPP namespace is also known as a Home nodeB Gateway or HNBGW) 202d. 4G is represented by EUTRAN or E-RAN 203, which includes an LTE UE 203a and LTE eNodeB 203b. Wi-Fi is represented by Wi-Fi access network 204, which includes a trusted Wi-Fi access point 204c and an untrusted Wi-Fi access point 204d. The Wi-Fi devices 204a and 204b may access either AP 204c or 204d. In the current network architecture, each "G" has a core network. 2G circuit core network 205 includes a 2G MSC/VLR; 2G/3G packet core network 206 includes an SGSN/GGSN (for EDGE or UMTS packet traffic); 3G circuit core 207 includes a 3G MSC/VLR; 4G circuit core 208 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 230, the SMSC 231, PCRF 232, HLR/HSS 233, Authentication, Authorization, and Accounting server (AAA) 234, and IP Multimedia Subsystem (IMS) 235. An HeMS/AAA 236 is present in some cases for use by the 3G UTRAN. The diagram is used to indicate schematically the basic functions of each network as known to one of skill in the art, and is not intended to be exhaustive. For example, 5G core 217 is shown using a single interface to 5G access 216, although in some cases 5G access can be supported using dual connectivity or via a non-standalone deployment architecture.

Noteworthy is that the RANs 201, 202, 203, 204 and 236 rely on specialized core networks 205, 206, 207, 208, 209, 237 but share essential management databases 230, 231, 232, 233, 234, 235, 238. More specifically, for the 2G GERAN, a BSC 201c is required for Abis compatibility with BTS 201b, while for the 3G UTRAN, an RNC 202c is required for Iub compatibility and an FGW 202d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 3:
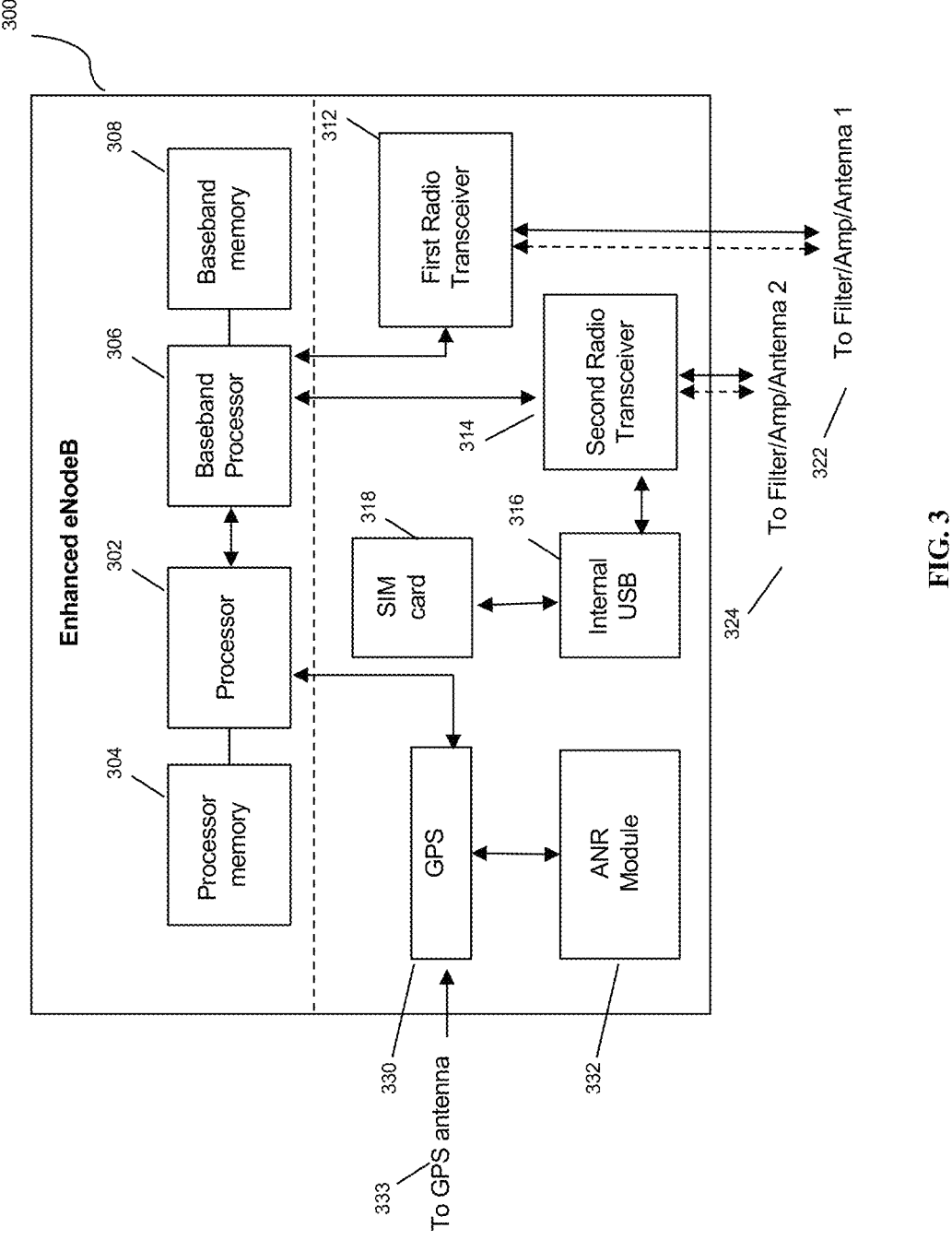
FIG. 3 is an enhanced eNodeB for performing the methods described herein, in accordance with some embodiments.

FIG. 3 is an enhanced eNodeB for performing the methods described herein, in accordance with some embodiments. Mesh network node 300 may include processor 302, processor memory 304 in communication with the processor, baseband processor 306, and baseband processor memory 308 in communication with the baseband processor. Mesh network node 300 may also include first radio transceiver 312 and second radio transceiver 314, internal universal serial bus (USB) port 316, and subscriber information module card (SIM card) 318 coupled to USB port 316. In some embodiments, the second radio transceiver 314 itself may be coupled to USB port 316, and communications from the baseband processor may be passed through USB port 316. The second radio transceiver may be used for wirelessly backhauling eNodeB 300.

Processor 302 and baseband processor 306 are in communication with one another. Processor 302 may perform routing functions, and may determine if/when a switch in network configuration is needed. Baseband processor 306 may generate and receive radio signals for both radio transceivers 312 and 314, based on instructions from processor 302. In some embodiments, processors 302 and 306 may be on the same physical logic board. In other embodiments, they may be on separate logic boards.

Processor 302 may identify the appropriate network configuration, and may perform routing of packets from one network interface to another accordingly. Processor 302 may use memory 304, in particular to store a routing table to be used for routing packets. Baseband processor 306 may perform operations to generate the radio frequency signals for transmission or retransmission by both transceivers 310 and 312. Baseband processor 306 may also perform operations to decode signals received by transceivers 312 and 314. Baseband processor 306 may use memory 308 to perform these tasks.

The first radio transceiver 312 may be a radio transceiver capable of providing LTE eNodeB functionality, and may be capable of higher power and multi-channel OFDMA. The second radio transceiver 314 may be a radio transceiver capable of providing LTE UE functionality. Both transceivers 312 and 314 may be capable of receiving and transmitting on one or more LTE bands. In some embodiments, either or both of transceivers 312 and 314 may be capable of providing both LTE eNodeB and LTE UE functionality. Transceiver 312 may be coupled to processor 302 via a Peripheral Component Interconnect-Express (PCI-E) bus, and/or via a daughtercard. As transceiver 314 is for providing LTE UE functionality, in effect emulating a user equipment, it may be connected via the same or different PCI-E bus, or by a USB bus, and may also be coupled to SIM card 318. First transceiver 312 may be coupled to first radio frequency (RF) chain (filter, amplifier, antenna) 322, and second transceiver 314 may be coupled to second RF chain (filter, amplifier, antenna) 324.

SIM card 318 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 300 is not an ordinary UE but instead is a special UE for providing backhaul to device 300.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 312 and 314, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 302 for reconfiguration.

A GPS module 330 may also be included, and may be in communication with a GPS antenna 332 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 332 may also be present and may run on processor 302 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 4:
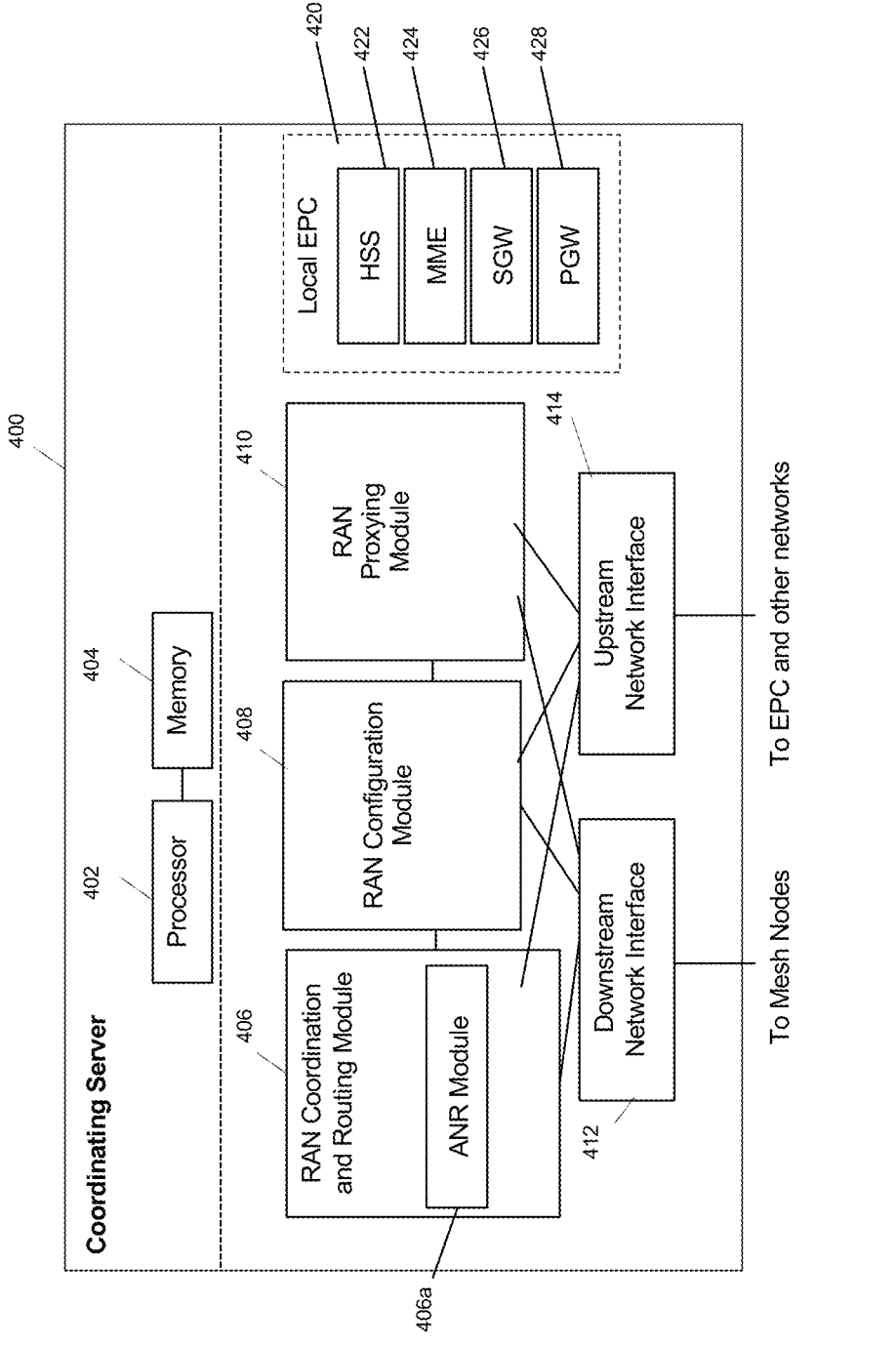
FIG. 4 is a coordinating server for providing services and performing methods as described herein, in accordance with some embodiments.

FIG. 4 is a coordinating server for providing services and performing methods as described herein, in accordance with some embodiments. Coordinating server 400 includes processor 402 and memory 404, which are configured to provide the functions described herein. Also present are radio access network coordination/routing (RAN Coordination and routing) module 406, including ANR module 406a, RAN configuration module 408, and RAN proxying module 410. The ANR module 406a may perform the ANR tracking, PCI disambiguation, ECGI requesting, and GPS coalescing and tracking as described herein, in coordination with RAN coordination module 406 (e.g., for requesting ECGIs, etc.). In some embodiments, coordinating server 400 may coordinate multiple RANs using coordination module 406. In some embodiments, coordination server may also provide proxying, routing virtualization and RAN virtualization, via modules 410 and 408. In some embodiments, a downstream network interface 412 is provided for interfacing with the RANs, which may be a radio interface (e.g., LTE), and an upstream network interface 414 is provided for interfacing with the core network, which may be either a radio interface (e.g., LTE) or a wired interface (e.g., Ethernet).

Coordinator 400 includes local evolved packet core (EPC) module 420, for authenticating users, storing and caching priority profile information, and performing other EPC-dependent functions when no backhaul link is available. Local EPC 420 may include local HSS 422, local MME 424, local SGW 426, and local PGW 428, as well as other modules. Local EPC 420 may incorporate these modules as software modules, processes, or containers. Local EPC 420 may alternatively incorporate these modules as a small number of monolithic software processes. Modules 406, 408, 410 and local EPC 420 may each run on processor 402 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the above systems and methods are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for demand-based dynamic carrier scaling, comprising;

determining, at a gateway supporting dynamically created cells in a wireless network, capacity demand;

when there is a demand for additional capacity, then dynamically providing, by the gateway, one or more cells as needed to handle the demand for additional capacity, wherein the one or more cells are dynamically provided at a same base station with virtualization capability;

when there is a demand for less than a current capacity, then dynamically turning off, by the gateway, one or more cells as needed to handle the demand for less than the current capacity; and moving a user equipment in the wireless network from at least one of 3G, 4G, or 5G to 2G for the user equipment to use voice traffic;

wherein the gateway is a virtualizing gateway situated between a radio access network and a core network in the wireless network, the virtualizing gateway performing virtualization of the dynamically created cells toward the core network and allocating a physical cell identity to a dynamically provided cell.

2. The method of claim 1, further comprising migrating at least one existing user to at least one of the dynamically provided one or more cells.

3. The method of claim 1, further comprising migrating at least one existing user from at least one of the one or more cells that are dynamically turned off.

4. The method of claim 1, wherein the wireless network is a Long Term Evolution (LTE) network having a first LTE cell operating at a first frequency in a first frequency band, and wherein when a capacity usage exceeds a threshold, the gateway dynamically activates a new dynamically generated LTE cell, using an adjacent frequency band having a same bandwidth as the first frequency band.

5. The method of claim 1, wherein at least one dynamically provided cell is at least one of 2G or 3G, and wherein additional dynamically provided cells are one or more of 2G, 3G or 4G.

6. The method of claim 1, further comprising interfacing with a 5G Standalone core network when needed data throughput reaches a certain threshold, and otherwise interfacing with a 5G non-standalone core network.

7. The method of claim 1, further comprising dynamically adding or turning off resources, wherein a resource may be one or more of bands, radio resources, transceivers, resource blocks, radio access technologies (RATs), frequencies, channels, higher power, lower power, coverage, cell edge augmentation, massive multiple-in, multiple-out (M-MIMO), beamforming, or 3GPP version compatibility.

8. A non-transitory computer-readable medium containing instructions for providing demand-based dynamic carrier scaling, when executed, cause a gateway to perform steps comprising:

determining, at a gateway supporting dynamically created cells in a wireless network, a capacity demand;

when there is a demand for additional capacity, then dynamically providing, by the gateway, one or more cells as needed to handle the demand for additional capacity, wherein the one or more cells are dynamically provided at a same base station with virtualization capability;

when there is a demand for less than a current capacity, then dynamically turning off, by the gateway, one or more cells as needed to handle the demand for less than the current capacity; and moving a user equipment in the wireless network from at least one of 3G, 4G, or 5G to 2G for the user equipment to use voice traffic;

wherein the gateway is a virtualizing gateway situated between a radio access network and a core network in the wireless network, the virtualizing gateway performing virtualization of the dynamically created cells toward the core network and allocating a physical cell identity to a dynamically provided cell.

9. The computer-readable medium of claim 8, further comprising instructions for migrating at least one existing user to at least one of the dynamically provided one or more cells.

10. The computer-readable medium of claim 8, further comprising instructions for migrating at least one existing user from at least one of the one or more cells that are dynamically turned off.

11. The computer-readable medium of claim 8, further comprising instructions wherein the wireless network is Long Term Evolution (LTE) network having a first LTE cell operating at a first frequency in a first frequency band, and wherein when usage exceeds a threshold, activating, using the gateway, a new dynamically generated LTE cell, using an adjacent frequency band having a same bandwidth as the first frequency band.

12. The computer-readable medium of claim 8, wherein at least one dynamically provided cell is at least one of 2G or 3G, and wherein additional dynamically provided cells are one or more of 2G, 3G or 4G.

13. The computer-readable medium of claim 8, further comprising instructions which when executed, cause interfacing with a 5G Standalone core network when needed data throughput reaches a certain threshold, and otherwise interfacing with a 5G non-standalone core network.

14. The computer-readable medium of claim 8, further comprising instructions which when executed, cause dynamically adding or turning off resources, wherein a resource may be one or more of bands, radio resources, transceivers, resource blocks, radio access technologies (RATs), frequencies, channels, higher power, lower power, coverage, cell edge augmentation, massive multiple-in, multiple-out (M-MIMO), beamforming, and 3GPP version compatibility.

15. A system for providing demand-based dynamic carrier scaling, comprising:

a gateway, supporting dynamically created cells in a wireless network, including a memory and a processor configured to:

determine a capacity demand;

when there is a demand for additional capacity, then dynamically provide one or more cells as needed to handle the demand for additional capacity, wherein the one or more cells are dynamically provided at a same base station with virtualization capability;

when there is a demand for less than a current capacity, then dynamically turn off one or more cells as needed to handle the demand for less than the current capacity; and move a user equipment in the wireless network from at least one of 3G, 4G, or 5G to 2G for the user equipment to use voice traffic;

wherein the gateway is a virtualizing gateway situated between a radio access network and a core network in the wireless network, the virtualizing gateway performing virtualization of the dynamically created cells toward the core network and allocating a physical cell identity to a dynamically provided cell.

16. The system of claim 15, wherein at least one dynamically provided cell is at least one of 2G or 3G, and wherein additional dynamically provided cells are one or more of 2G, 3G or 4G.

17. The system of claim 15, wherein the processor is further configured to interface with a 5G Standalone core network when needed data throughput reaches a certain threshold, and otherwise interface with a 5G non-standalone core network.

18. The system of claim 15, wherein the processor is further configured to dynamically add or turn off one or more resources, wherein a resource may be one or more of bands, radio resources, transceivers, resource blocks, radio access technologies (RATs), frequencies, channels, higher power, lower power, coverage, cell edge augmentation, massive multiple-in, multiple-out (M-MIMO), beamforming, and 3GPP version compatibility.

* * * * *